June 6, 1944.  L. P. JOSSIM ET AL  2,350,683
FLUID DRIVE
Filed Nov. 25, 1941  2 Sheets-Sheet 1

Inventors
Leopold Paul Jossim
John Stuart Kellett
By Clarence A. O'Brien
Attorney

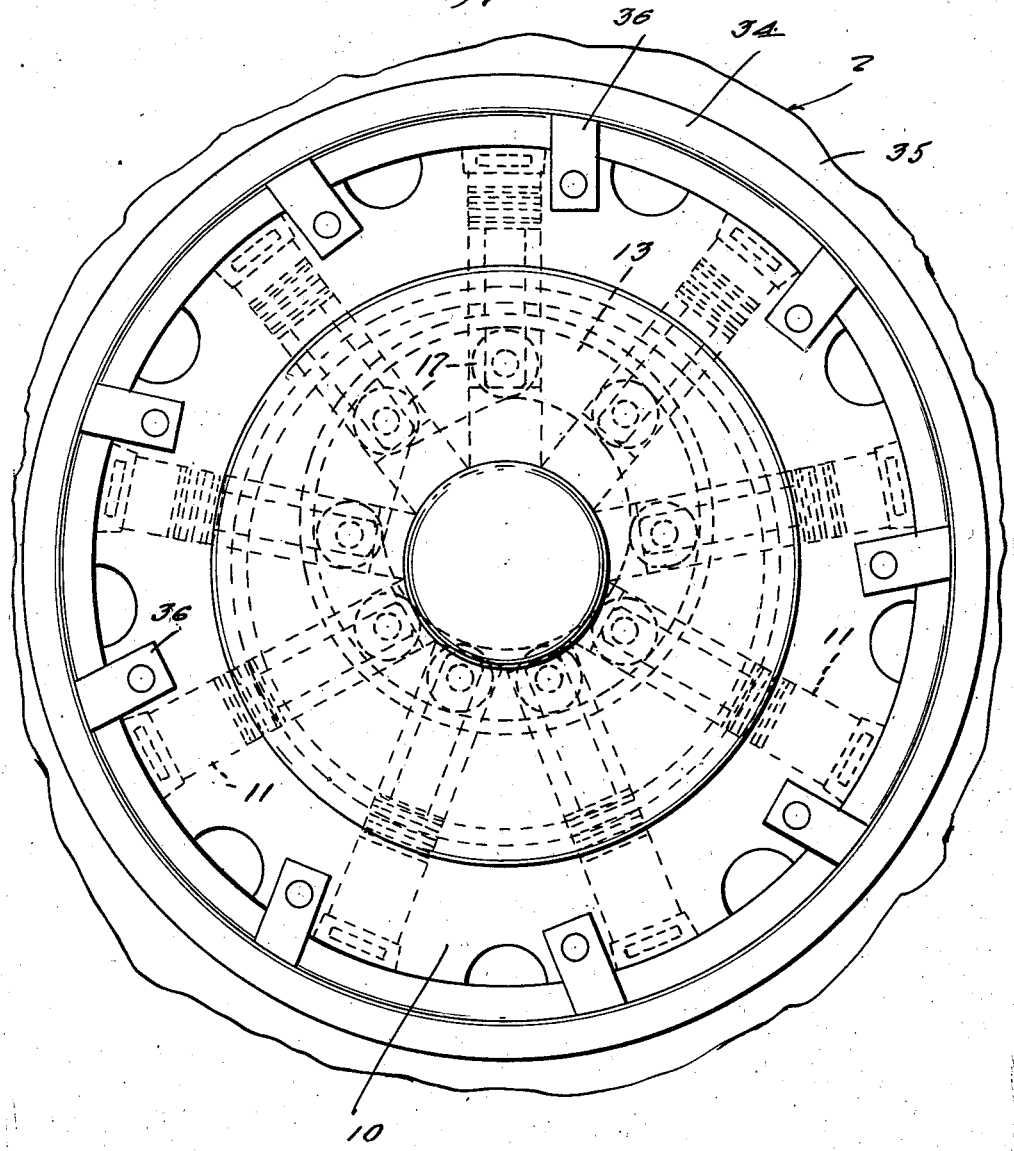

Patented June 6, 1944

2,350,683

UNITED STATES PATENT OFFICE 2,350,683

FLUID DRIVE

Leopold Paul Jossim and John Stuart Kellett, Royal Oak, Mich.

Application November 25, 1941, Serial No. 420,440

1 Claim. (Cl. 121—59)

The present invention relates to new and useful improvements in fluid drives particularly for motor vehicles although said drive may, of course, be used in any other manner and for any other purpose for which it may be found adapted and desirable.

The primary object of the invention is to provide, in a manner as hereinafter set forth, a fluid drive of the aforementioned character comprising novel means whereby any or all of the wheels of a vehicle may be actuated without the necessity of using the customary differential gears, shafts, bearings, etc.

Other objects of the invention are to provide a fluid drive of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in side elevation of the wheel with the major portion of the tire broken away.

Figure 1:
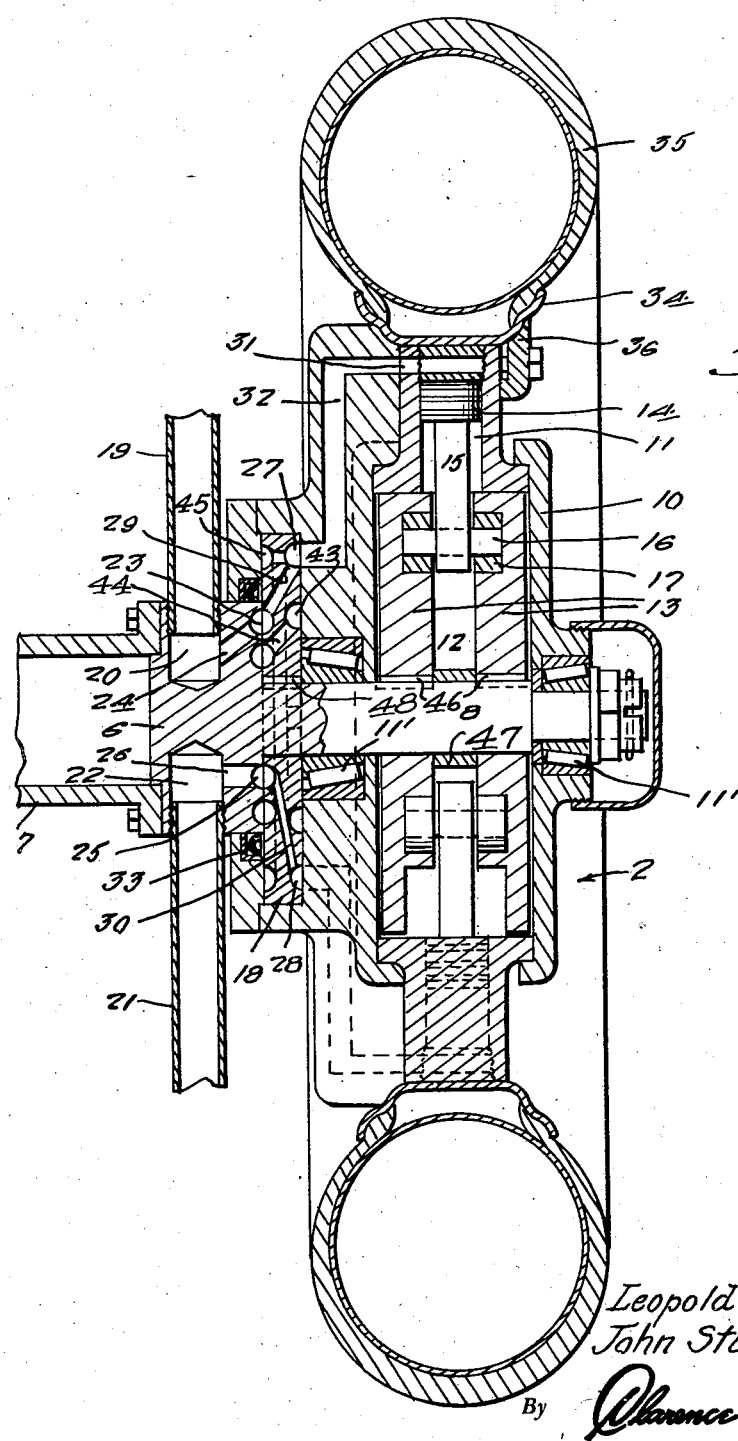
Figure 1 is a cross-sectional view through a vehicle wheel equipped with a fluid drive in accordance with the present invention.

Referring now to the drawings in detail, it will be seen that the embodiment of the invention which has been illustrated comprises a circular block 6 which is rigidly secured on the outer end of a tubular axle housing 7. Projecting from the block 6 is a spindle 8. Journaled on the spindle 8 is a wheel which is designated generally by reference numeral 2.

The wheel 2 includes a circular housing 10 of any suitable metal, which housing is journaled on the spindle 8. Roller bearings 11' are provided on the spindle 8 for the housing 10. The housing 10 has bored therein a plurality of radial cylinders 11. The central portion of the housing 10 is formed to provide a chamber 12 with which the radial cylinders 11 communicate.

The chamber 12 of the housing 10 accommodates a pair of spaced, opposed, stationary face cams 13 which are fixed by keys 46 on the spindle 8. Pistons 14 are operable in the cylinders 11. The pistons 14 are integral with connecting rods 15. The rods 15 extend between the cams 13 and have mounted transversely in their inner end portions pins 16 which project into the grooves or channels of said cams. Rollers 17 are journaled on the end portions of the pins 16 and travel in the face cams 13 thus operatively connecting the pistons 14 to said cams. A collar 47 on the spindle 8 faces the cams 13.

The inner portion of the housing 10 encloses and rotates about a disc 18 which is fixed by a key 48 on the spindle 8 and which abuts the block 6. A fluid delivery pipe 19 from a suitable pump communicates with a chamber 20 in the block 6. A fluid return pipe 21 communicates with a substantially similar chamber 22 in the block 6. The opposed faces of the block 6 and the disc 18 have formed therein complemental annular channels 23. A passage 24 in the block 6 connects the chamber 20 with the channels 23. Also formed in the opposed faces of the block 6 and the disc 18 are complemental annular channels 25. A passage 26 establishes communication between the channels 25 and the chamber 22. Formed in the outer side of the disc 18 are segmental channels 27 and 28. A passage 29 establishes communication between the channels 23 and the channel 27. A passage 30 establishes communication between the channels 28 and 25.

Communicating with the outer end portions of the cylinders 11 are ports 31 which serve for both intake and exhaust. Angular passages 32 connect the ports 31 first with the channel 27 and then with the channel 28 as the wheel rotates.

A lubricant seal 33 is provided in the inner portion of the wheel. Mounted on the periphery of the housing 10 is a rim 34 which carries a pneumatic tire 35. Lugs 36 on the housing 10 removably secure the rim 34 in position.

It is thought that the operation of the apparatus will be readily apparent from a consideration of the foregoing. Briefly, fluid under pressure enters the chamber 20 from the line 19. When the pistons 14 are riding on the high portions of the cams 13 the passages 32 are in communication with the channel 27. Thus, fluid enters the cylinders 11 under pressure from the chamber 20 and the pistons 14 are forced inwardly. This inward pressure causes the rollers 17 to travel on the cams 13 toward the low portions thereof thereby causing the housing 10 to rotate about the stationary cams. When the low portions of the stationary cams 13 are reached and the pistons are at substantially the limit of their inward stroke the passages 32 are brought into communication with the channel 28 and, as the pistons 14 are moved outwardly by the cams 13 the fluid is expelled from the cylinders 11 and is discharged through the channel 28, the passage 30, the channels 25, the passage 26, the chamber 22 and the return line 21. An annular channel 43 in the outer face of the disk 18 receives fluid for lubrication from the channels 25 through a passage 44. A substantially similar channel 45 in the inner face of the disk 18 communicates with the channel 27.

It is believed that the many advantages of a hydraulic drive constructed in accordance with the present invention will be readily understood, and although a preferred embodiment of the apparatus is as illustrated and described, it is to be understood that changes in details of construction and in the combination and arrangement of parts may be resorted to which will fall within the scope of the invention as claimed.

What is claimed is:

A fluid drive of the character described for vehicles comprising, a tubular housing, a stationary, circular block mounted on one end of said housing, said block having a pair of chambers therein, a spindle projecting from the block, a wheel journaled on said spindle, said wheel comprising a pair of spaced, opposed side plates and a radial cylinder block mounted on said plates, a pair of stationary opposed face cams mounted on the spindle between the side plates and within the confines of the cylinder block, fluid actuated pistons mounted for reciprocation in the cylinder block and operatively connected to the cams, a stationary disk on the spindle between the block and one of the plates, said disk and block having opposed, complemental concentric pairs of channels therein, the inner channels communicating with one of the chambers, the outer channels communicating with the other of said chambers, said disk further having concentric, segmental channels in one face thereof, one of the segmental channels communicating with the innermost of the first-named channels, the other segmental channel communicating with the outermost of the first-named channels, one of the plates having passages therein for connecting the cylinders successively to the segmental channels, a fluid delivery pipe connected to the block and communicating with one of the chambers, and a fluid discharge pipe connected to the block and communicating with the other of said chambers.

LEOPOLD PAUL JOSSIM.
JOHN STUART KELLETT.